June 25, 1940. D. B. MONROE 2,205,729
INCLINOMETER
Filed Dec. 1, 1938
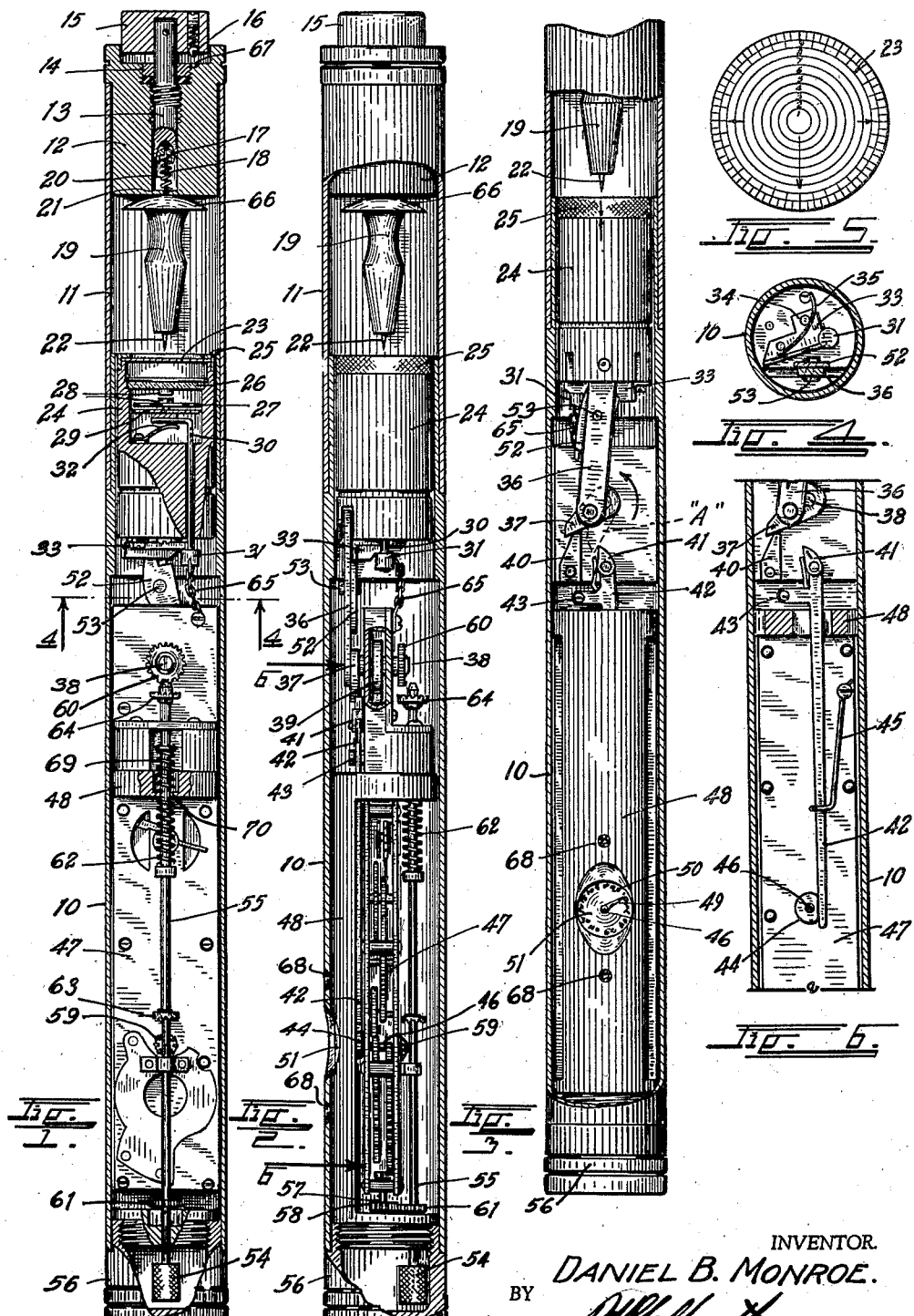
INVENTOR.
DANIEL B. MONROE.
BY
ATTORNEY.

Patented June 25, 1940

2,205,729

UNITED STATES PATENT OFFICE 2,205,729

INCLINOMETER

Daniel B. Monroe, Denver, Colo.

Application December 1, 1938, Serial No. 243,344

9 Claims. (Cl. 33—221)

This invention relates to an instrument for determining the amount of incline and the direction of incline of well holes and is more particularly designed as an improvement over applicant's prior Patents Nos. 2,057,787 and 2,089,153.

The principal object of this invention is to provide an instrument of the above character in which the winding of the actuating clock, the setting of the time interval, and the setting of the trigger can all be accomplished from a single control member which is absolutely sealed against the entrance of moisture. In former devices of this type, winding and setting keys and openings were necessary. The keys and openings formed entrances whereby moisture, dust, mud, and oil entered the instrument to render it inoperative. The improved instrument is absolutely sealed and yet all the necessary adjustments and settings can be readily accomplished.

Other objects of the invention are: to provide an oil well surveying instrument which can be lowered through or with the drill pipe of an oil well drilling rig and which will produce a visible record of the incline of the drill pipe at any desired point and an accurate record of the direction of incline; to provide an instrument in which exceedingly wide angle capacity can be had from an instrument of minimum length; to provide an instrument in which it will be impossible for the plumb bob or marking member to damage the record or target while the instrument is being inserted or withdrawn; and to provide a plumb bob support in an instrument of this character by means of which the plumb bob may be resiliently locked when not in use to prevent its swinging against the casing.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a vertical section through the improved oil well surveying instrument.

Fig. 2 is a similar section taken at right angles to the section of Fig. 1.

Fig. 3 is a view with the casing broken away to show the operating mechanism in side elevation.

Fig. 4 is a cross section looking upwardly on line 4—4, Fig. 1.

Fig. 5 is a detail view of the target disc employed in the instrument.

Fig. 6 is a fragmentary section taken on the line 6—6, Fig. 2.

The improved instrument comprises: a main or lower tubular casing 10 which telescopically engages an upper tubular casing 11, the joint between the two casings being relatively long and relatively tight to prevent the entrance of moisture. The upper casing 11 is closed at its top by means of a plug 12 which is forced into the upper casing 11 to form a long, water-tight, sealed joint therewith.

A threaded plumb bob stud 13 extends axially upwardly from a counter-bored hole in the plug 12 and is sealed against the entrance of moisture by means of a packing nut 14. The upper extremity of the stud terminates in a finger button 15 carrying a spring actuated click ball 16 which holds the knob in the completely "screwed in" position so that it cannot vibrate or loosen. The lower extremity of the stud 13 is cupped to form a socket for a ball 17 which is drilled to receive a flexible chain or cable 18 upon which a plumb bob 19 is suspended.

The entire weight of the plumb bob is supported by the ball 17 and the ball in turn is supported by means of a compression spring 20 which acts against a perforated bottom 21 in the counter-bore. This construction forms a swivel joint which allows the stud to be rotated without rotating the cable 18 or the plumb bob 19. When the stud is screwed downwardly, the plumb bob will be lowered to a free swinging position.

The bottom of the plumb bob carries a marking point 22, against which a marking target 23 is forced at pre-set times. The target is removably clamped in the upper extremity of a compass housing 24 by means of a clamping bezel 25.

The upper portion of the compass housing 24 is hollow and is provided with a compass glass 26, below which a magnetic compass needle 27 is mounted upon a suitable pivot. At the axis of both the glass and the needle 27 a locking pad 28 is carried. The compass needle is mounted on a movable compass face 29 which in turn is carried upon a face supporting rod 30 which extends downwardly through the housing 24 and terminates in a head 31.

The compass face is constantly urged upwardly by mans of a leaf spring 32 and, when the head 31 is released, this spring forces the compass face upwardly until the two locking pads 28 contact each other to lock the compass needle at pre-set times. The compass face is held downwardly against the action of the spring 32 by means of a latch member 33 pivoted at 34 on the bottom of the compass housing 24.

A wire spring 35 acts to constantly force the latch member 33 toward the head 31 and, if this head is pulled downwardly, the latch will snap between it and the compass housing to hold the compass needle in the operating position.

The compass housing 24 is moved upwardly and downwardly by means of a connecting rod 36 which, at its upper extremity, is secured to the compass housing and, at its lower extremity, to a crank arm 37. The crank arm 37 is secured on a crank shaft 38 upon which a clock spring 39 is mounted. The clock spring 39 constantly tends to rotate the crank arm in a counter-clockwise direction, looking at Fig. 3. The arc of movement in this direction is limited by means of a stop 40.

To set the device, the crank arm 37 is rotated in a clockwise direction until its point snaps past a locking pawl 41 on the extremity of a trigger lever 42. The set position is indicated in broken line at A, Fig. 3. The trigger lever is pivoted near its upper extremity upon a suitable pivot pin 43. The lower extremity thereof is relatively long and extends downwardly to a releasing cam 44.

The cam 44 is formed with a flat side and is secured on a time shaft 46 which is rotated through the medium of suitable clock works 47. The clock works are mounted in a cylindrical clock frame 48 upon which the crank shaft 38 and its related mechanism are mounted. The shaft 46 carries an indicating hand 49 which moves around a time scale 50 visible through a clock glass 51 sealed in the side of the frame 48. The lower casing is cut away opposite the clock glass 51 and the clock frame is drawn tightly against the outer casing at this point by means of counter-sunk screws 68 to prevent the entrance of dust and moisture. The screws 68 support the entire weight of the operating mechanism below the plumb bob.

It can be seen that as the clock shaft 46 rotates it will eventually reach a position where the flat side on the releasing cam 44 will allow the lower extremity of the lever 42 to swing to the left, as shown in Fig. 6, thus lowering the upper extremity thereof and the locking pawl 41 from contact with the crank arm 37. This will allow the clock spring 39 to snap the arm almost one complete revolution in a counter-clockwise direction. As the crank arm swings across its highest point, the compass housing 24 will be elevated sufficiently far to force the target 23 against the point 22 and the former will be immediately withdrawn as the crank arm 37 descends to the stop 40.

An instant after the crank arm crosses its top position, it will strike a rocker 52 which is pivoted at 53 on the connecting rod 36. The upper extremity of this rocker rests against the compass latch member 33 and when it is struck, it swings against the latch member causing it to be rotated from its engagement under the head 31. This allows the spring 32 to snap the compass needle upwardly to bring the pads 28 into contact and lock the needle at the exact instant that the point 22 pierces the target. It will remain in this locked position since the latch member cannot again enter between the head 31 and the compass housing until the supporting rod 30 is withdrawn.

It is necessary to provide means for winding the main spring of the clock works 47; for rotating the crank arm 37 backwardly to the pre-set position; for releasing the compass needle; and for setting the hand 49 at the desired time interval. All of the above operations are accomplished in the present device from a single knurled finger knob 54 which is mounted upon a pre-setting shaft 55 that extends below the clock frame 48. The finger knob 54 is enclosed in a water-tight, threaded cap 56 which also seals the bottom of the housing 10.

The clockworks 47 contains the usual winding shaft 57 upon which a winding gear 58 is mounted. The time shaft 46 is provided with a miter gear 59 and the crank shaft 38 is provided with a miter or spur gear 60.

The pre-setting shaft 55 is balanced between a lower spring 62 and an upper spring 69 both of which are compressed between a pair of collars on the shaft 55 and a bottom 70 in a counter-bore in the frame 48. The shaft 55 carries a first gear 61, which is normally held in engagement with the winding gear 58 by means of a compression spring 62; a second gear 63, which is normally positioned above the miter gear 59; and a third gear 64, normally positioned below the gear 60.

Therefor, if the shaft 55 be rotated when in its normal position, it will rotate the winding gear 58 to wind the main spring of the clock works 47. If the finger knob 54 is pulled downwardly or away from the clock works, it will disengage the gears 58 and 61 and engage the gears 63 and 59 so that rotation thereof will turn the winding hand 49 and the releasing cam 44 to the desired pre-set position. If the finger member 55 be pushed upwardly, it will release the gears 58, 61, 59 and 63 and will force the gear 64 into mesh with the gear 60 so that rotation of the shaft 55 will rotate the crank arm 47 backwardly toward the locked position on the pawl 41.

It will be noted that a chain 65 extends from a fixed connection on the clock frame 48 to the head 31 on the supporting rod 30. This chain is of a length to draw the rod 30 downwardly its full movement as the crank arm 37 passes its extreme top position to allow the latch member 33 to snap between the head 31 and the compass housing 24. Therefore rearward rotation of the crank arm not only sets the crank arm but also automatically releases and locks the compass in the released position.

It is believed that the operation of the device will be clear to anyone skilled in the art from the above description. In use, the instrument is pre-set for a certain time interval sufficient to allow it to be lowered to the desired position in the well and the plumb bob is released by screwing the stud shaft inwardly to its full downward position. The entire instrument is then snugly enclosed in an outer protective barrel, such as shown in applicant's prior patents, and the barrel is lowered in the drill stem of the well drilling equipment.

After the time interval has elapsed, the instrument is withdrawn, the casing 11 is removed from the casing 10, the target 23 is removed, and the locked position of the compass needle is noted. The distance the perforation made by the point 22 is from the axis of the target will give the degree of deflection and the circumferential position of the perforation with reference to the locked position of the compass needle will give the exact compass direction of the deflection.

When the device is not in use, the knob 15 is rotated to free the ball 17 to allow the spring 18 to lift the plumb bob to the position of Fig. 1 so that accidental contact with the target disc will be prevented. The spring 20 also acts to resiliently hold the plumb bob in an axial position to prevent it from striking the sides of the casing 11. The spring 20 closes with a round top cap 66 on the plumb bob to hold it in an axial position, yet allows sufficient resiliency to prevent breakage of the cable 18 in case of extreme mishandling.

The entire operating mechanism can be slid from the bottom of the casing 10 for inspection and repair by simply removing the screws 68.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A plumb bob suspension for oil well surveying instruments comprising: a housing surrounding a plumb bob; a plug member closing the top of said housing, there being an axial passage through said plug member; a ball in said passage; a spring supporting said ball therein; a flexible member extending from said ball to said plumb bob and holding the latter stationary against the bottom of said plug; and means for forcing said ball downwardly to release said plumb bob from said plug and allow it to be freely suspended.

2. A plumb bob suspension for oil well surveying instruments comprising: a housing surrounding a plumb bob; a plug member closing the top of said housing, there being an axial passage through said plug member; a ball in said passage; a spring carried by said plug member and supporting said ball therein; a flexible member extending from said ball to said plumb bob so that the latter may be supported by said spring; and means for forcing said ball downwardly to release said plumb bob from said plug and allow it to be freely suspended, the top of said plumb bob being rounded so that when pulled upwardly by said spring, the rounded surface will act to bring said plumb bob to an axial position.

3. A plumb bob suspension for oil well surveying instruments comprising: a plumb bob supporting member having an axial perforation in its bottom; a flexible member extending through said perforation; a plumb bob suspended on the lower extremity of said flexible member; spring means carried by said supporting member and acting against the other extremity of said flexible member to urge it upward, said flexible member being sufficiently short to allow said spring to bring said plumb bob against the bottom of said supporting member; and means for reacting against said spring means when desired to lower said plumb bob from said bottom.

4. A plumb bob suspension for oil well surveying instruments comprising: a plumb bob supporting member having an axial perforation in its bottom; a flexible member extending through said perforation; a plumb bob suspended on the lower extremity of said flexible member; spring means for urging the other extremity of said flexible member upward to bring said plumb bob against the bottom of said supporting member; manual means for reacting against said spring means when desired to lower said plumb bob from said bottom; and a spherical head on said plumb bob contacting and rocking against said bottom.

5. A plumb bob suspension for oil well surveying instruments comprising: a hollow supporting member having an axial perforation in its bottom; a flexible member extending through said perforation; a plumb bob suspended on the lower extremity of said flexible member; spring means within said supporting member and acting against the upper extremity of said flexible member to urge it upward, said flexible member being sufficiently short to allow said spring to bring said plumb bob against the bottom of said supporting member; and means for forcing the upper extremity of said flexible member downward to release said plumb bob.

6. A plumb bob suspension for oil well surveying instruments comprising: a hollow supporting member having an axial perforation in its bottom; a plumb bob stud threaded into the top of said member; a flexible member extending through said perforation; a plumb bob suspended on the lower extremity of said flexible member; a compression spring within said supporting member acting against the upper extremity of said flexible member to urge it upward, said flexible member being sufficiently short to allow said spring to bring said plumb bob against the bottom of said supporting member; and means for threading plumb bob stud downward to compress said spring and release said plumb bob from contact with said supporting member.

7. A plumb bob suspension for oil well surveying instruments comprising: a supporting member having a vertical axial passage extending therethrough; a shoulder in the bottom of said passage; a compression spring supported on said shoulder; a ball supported by said spring; a flexible member extending from said ball downwardly through said spring; a plumb bob suspended on the lower extremity of said flexible member, said flexible member being sufficiently short to allow said spring to bring said plumb bob against the bottom of said supporting member; and means for forcing said ball downward to lower said plumb bob from said supporting member.

8. A plumb bob suspension for oil well surveying instruments comprising: a supporting member having a vertical axial passage extending therethrough; a shoulder in the bottom of said passage; a compression spring supported on said shoulder; a ball supported by said spring; a flexible member extending from said ball downwardly through said spring; a plumb bob suspended on the lower extremity of said flexible member, said flexible member being sufficiently short to allow said spring to bring said plumb bob against the bottom of said supporting member; and a releasing member threaded into the upper portion of said passage for facing said ball downwardly to lower said plumb bob from said supporting member.

9. A plumb bob suspension for oil well surveying instruments comprising: a supporting member having a vertical axial passage extending therethrough; a shoulder in the bottom of said passage; a compression spring supported on said shoulder; a ball supported by said spring; a flexible member extending from said ball downwardly through said spring; a plumb bob suspended on the lower extremity of said flexible member, said flexible member being sufficiently short to allow said spring to bring said plumb bob against the bottom of said supporting member; and a releasing member threaded into the upper portion of said passage for facing said ball downwardly to lower said plumb bob from said supporting member, said releasing member having an axial socket in its lower extremity for receiving said ball.

DANIEL B. MONROE.